United States Patent
Nam

(10) Patent No.: US 9,185,599 B2
(45) Date of Patent: Nov. 10, 2015

(54) METHOD AND DEVICE FOR MANAGING INTERFERENCE IN NEIGHBOURING CELLS HAVING MULTIPLE SENDING AND RECEIVING NODES

(75) Inventor: Junyoung Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 170 days.

(21) Appl. No.: 13/497,844

(22) PCT Filed: Sep. 20, 2010

(86) PCT No.: PCT/KR2010/006509
§ 371 (c)(1),
(2), (4) Date: Mar. 23, 2012

(87) PCT Pub. No.: WO2011/037413
PCT Pub. Date: Mar. 31, 2011

(65) Prior Publication Data
US 2013/0078991 A1 Mar. 28, 2013

(30) Foreign Application Priority Data
Sep. 23, 2009 (KR) .......... 10-2009-0090188
Oct. 13, 2009 (KR) .......... 10-2009-0097285

(51) Int. Cl.
*H04W 28/04* (2009.01)
*H04B 7/02* (2006.01)
(Continued)

(52) U.S. Cl.
CPC ............. *H04W 28/048* (2013.01); *H04B 7/024* (2013.01); *H04L 1/0026* (2013.01);
(Continued)

(58) Field of Classification Search
CPC .. H04W 28/048; H04W 28/04; H04B 7/0634; H04B 7/024
USPC .................... 455/423, 67.11, 67.13
See application file for complete search history.

(56) References Cited

U.S. PATENT DOCUMENTS

2005/0009524 A1* 1/2005 Garani et al. ............. 455/445
2005/0152329 A1* 7/2005 Krishnan et al. .......... 370/345
(Continued)

FOREIGN PATENT DOCUMENTS

WO 2011/037413 A2 3/2011

OTHER PUBLICATIONS

Cadambe, Viveck R. et al., "Interference Alignment and Degrees of Freedom of the K-User Interface Channel," IEEE Transactions on Information Theory, vol. 54(8)3425-3441 (2008).
(Continued)

*Primary Examiner* — Qun Shen
(74) *Attorney, Agent, or Firm* — Nelson Mullins Riley & Scarborough LLP

(57) ABSTRACT

Disclosed is method for controlling interference in a wireless system having multiple sending and receiving nodes. In the method for controlling interference in a wireless system having multiple sending and receiving nodes, a plurality of receiving nodes share each other's channel information, each of the receiving nodes uses the shared channel information to calculate a precoding matrix which is fed back to the sending nodes, and each of the sending nodes uses each of the precoding matrices received as feedback to transmit a send signal to the receiving nodes, thereby controlling interference. Complete interference alignment can be achieved even by just sharing channel information between receiving nodes, and the invention can be employed not only for inter-cell interference but also for intra-cell interference environments.

6 Claims, 4 Drawing Sheets

(51) Int. Cl.
*H04W 76/02* (2009.01)
*H04B 7/06* (2006.01)
*H04W 72/04* (2009.01)
*H04W 72/08* (2009.01)
*H04L 1/00* (2006.01)

(52) U.S. Cl.
CPC .......... *H04L 1/0077* (2013.01); *H04W 76/023* (2013.01); *H04B 7/0634* (2013.01); *H04L 1/0003* (2013.01); *H04L 1/0009* (2013.01); *H04W 72/0406* (2013.01); *H04W 72/085* (2013.01)

(56) References Cited

U.S. PATENT DOCUMENTS

| | | | |
|---|---|---|---|
| 2008/0123520 A1* | 5/2008 | Ji et al. | 370/216 |
| 2008/0165875 A1* | 7/2008 | Mundarath et al. | 375/262 |
| 2009/0201861 A1* | 8/2009 | Kotecha | 370/329 |
| 2009/0207822 A1* | 8/2009 | Kim et al. | 370/338 |
| 2010/0035555 A1* | 2/2010 | Bala et al. | 455/63.1 |
| 2010/0081448 A1* | 4/2010 | Wong et al. | 455/452.1 |
| 2010/0227566 A1* | 9/2010 | Kim et al. | 455/67.13 |
| 2010/0261469 A1* | 10/2010 | Ribeiro et al. | 455/423 |
| 2010/0322176 A1* | 12/2010 | Chen et al. | 370/329 |
| 2012/0044815 A1* | 2/2012 | Geirhofer et al. | 370/248 |
| 2012/0052895 A1* | 3/2012 | Clerckx et al. | 455/509 |
| 2013/0163752 A1* | 6/2013 | Baek et al. | 380/44 |

OTHER PUBLICATIONS

Gomadam, Krishna et al., "Approaching the Capacity of Wireless Networks through Distributed Interference Alignment," IEEE Global Telecommunications Conference, IEEE Globecom, pp. 1-6 (2008).

Qu, Qi et al., "Cognitive Radio Based Multi-User Resource Allocation in Mobile Ad Hoc Networks Using Multi-Carrier CDMA Modulation," IEEE Journal on Selected Areas in Communications, vol. 26(1)10-82 (2008).

Stankovic, Vladimir et al., "Cooperative Diversity for Wireless Ad Hoc Networks," IEEE Signal Processing Magazine, vol. 23(5):37-49 (2006).

International Search Report and Written Opinion for Application No. PCT/KR2010/006509, pp. 1-9, dated Jun. 23, 2011.

* cited by examiner (a) CHANNEL MEASUREMENT (b) SHARING CSI VIA AD-HOC NETWORK (c) PRECODING MATRIX FEEDBACK

METHOD AND DEVICE FOR MANAGING INTERFERENCE IN NEIGHBOURING CELLS HAVING MULTIPLE SENDING AND RECEIVING NODES

RELATED APPLICATIONS

This application is a 35 U.S.C. §371 filing of International Application Number PCT/KR2010/006509 which was filed on Sep. 20, 2010, which claims priority to, and the benefit of, Korean Application Nos. 10-2009-0090188, filed on Sep. 23, 2009; and 10-2009-0097285, filed on Oct. 13, 2009. The contents of the aforementioned application are hereby incorporated herein by reference.

TECHNICAL FIELD

The present invention relates to a method of controlling interference in a wireless system having multiple transmission/reception nodes.

BACKGROUND ART

With the development of digital wireless communication technology, a wireless communication system having a composite transmission/reception relationship is necessary between multiple nodes. The largest problem to be solved in this system is to control interference between the multiple nodes.

In a cellular mobile communication system, interference between multiple nodes is largely divided into intra-cell interference and inter-cell interference. For example, the intra-cell interference occurs when one transmission cell transmits a signal to multiple users. Here, the transmission node knows all transmission signals, and positive cooperation is possible upon transmission. An example of the positive cooperation is dirty-paper coding in a multiuser environment. On the other hand, the inter-cell interference occurs, for example, when multiple transmission cells respectively transmit signals to their own users. Here, one transmission node knows only its own transmission signal, and positive cooperation between cells is impossible.

In third generation partnership project (3GPP), one of standardizations bodies for 4G mobile communication systems, a coordinated multi-point transmission (CoMP) technique has been introduced to control the inter-cell interference. An example of an intra-cell interference environment is multiuser multiple-input multiple-output (MIMO).

To use channel capacity in which the inter-cell interference exists, a transmission node should be informed of channel state information including all channel matrices. A recently introduced interference alignment technique [Reference Literature 1: Cadambe and Jafar, "Interference Alignment and Degrees of Freedom of the K-User Interference Channel," IEEE Trans. Info. Theory] is known as a technique capable of maximally obtaining a spatial multiplexing gain or a degree of freedom. In this technique, the channel capacity may be obtained at a high signal-to-noise ratio (SNR). However, since the interference alignment technique is under the assumption that all reception nodes as well as transmission nodes should know channels between all nodes, implementation is difficult.

On the other hand, it has been confirmed that the channel capacity of a multiuser MIMO system, which is an environment where the intra-cell interference exists, may be obtained by the dirty-paper coding technique. However, a significantly complex coding technique such as a lattice code is required to implement dirty-paper coding, and also there is a difficulty that a transmission node should know channel state information (CSI) of all links.

DISCLOSURE

Technical Problem

The present invention has been made to solve the above-described problem, and an object of the present invention is to provide an interference control method in a wireless system having multiple transmission/reception nodes capable of controlling interference by causing reception nodes to mutually share channel state information (CSI).

Technical Solution

According to an exemplary embodiment for achieving the object of the present invention, there is provided an interference control method in a wireless system having multiple transmission/reception nodes, including the steps of: performing, by one of a plurality of reception nodes belonging to a predetermined group, a user equipment (UE) pairing procedure with a transmission node; and performing, by the one reception node, a channel information sharing procedure of sharing channel information with other reception nodes belonging to the predetermined group. The predetermined group may include a plurality of UEs located in an edge of a plurality of cells and affected by strong interference as the plurality of reception nodes. The one reception node may be a master UE. The UE pairing procedure may include the steps of: receiving, by the master UE, pilot signals transmitted from neighboring cells to perform channel measurement; and reporting, by the master UE, cell identities (IDs) of neighboring cells having strong interference to the master UE's serving cell. The UE pairing procedure may further include the step of collecting, by the serving cell, notifications of the IDs of the neighboring cells having the strong interference from UEs of the cell edge, classifying a user group located in an overlapped region between the serving cell and the neighboring cells, and assigning signaling and data resources predefined between the serving cell and the neighboring cells to UEs of the overlapped region. The channel information sharing procedure may include transmitting and receiving channel information of the plurality of reception nodes via device-to-device (D2D) between the plurality of reception nodes belonging to the predetermined group. The channel information sharing procedure may include the step of deciding, by the master UE, a precoding matrix of each UE within the user group by using channel information of the plurality of reception nodes. The channel information sharing procedure may further include the step of transmitting, by the master UE, the decided precoding matrix to each UE within the user group. The interference control method may further include the step of feeding, by each reception node, the precoding matrix decided using the shared channel information back to the transmission node. The channel information sharing procedure may include transmitting and receiving channel information of the plurality of reception nodes via an ad-hoc network between the plurality of reception nodes belonging to the predetermined group.

According to another exemplary embodiment for achieving the object of the present invention, there is provided an interference control method in a wireless system having multiple transmission/reception nodes, including the steps of: mutually sharing, by reception nodes belonging to a predetermined group, channel information; and calculating, by each reception node, a precoding matrix using the shared channel information and feeding the precoding matrix back to a transmission node. Each reception node may control interference between users by calculating the precoding matrix for interference alignment, feeding the precoding matrix back to the transmission node, and performing the interference alignment. The predetermined group may include a plurality of UEs located in an edge of a plurality of cells and affected by strong interference. The interference control method may further include the step of receiving, by each reception node, pilot signals from neighboring cells around the each reception node to perform channel measurement.

According to still another exemplary embodiment for achieving the object of the present invention, there is provided an interference control method in a wireless system having multiple transmission/reception nodes. In the interference control method, a plurality of reception nodes mutually share channel information. Each reception node calculates a precoding matrix by using the shared channel information and feeds the precoding matrix back to a transmission node. Each transmission node transmits a transmission signal to a reception node by using the precoding matrix fed back from each reception node, so that interference is controlled.

According to yet another exemplary embodiment for achieving the object of the present invention, there is provided an interference control method in a wireless system having multiple transmission/reception nodes, including the steps of: measuring, by reception nodes, channel states of transmission nodes by using pilot signals transmitted from the transmission nodes to acquire channel information of the transmission nodes; mutually sharing, by the reception nodes, the channel information via an ad-hoc network to acquire all pieces of CSI; calculating, by each reception node, a precoding matrix using all the pieces of channel information; feeding, by a reception node i (where i is a natural number), a precoding matrix back to a transmission node i; and transmitting, by each transmission node, a transmission signal to a reception node by using the precoding matrix fed back from each reception node.

Advantageous Effects

The interference alignment technique of the related art is significantly limited in implementation due to the assumption that all transmission/reception nodes know channel information. However, a multi-node transmission/reception method proposed in the present invention can implement a perfect interference alignment only by sharing channel information between reception nodes, and can improve the implementation of the interference alignment technique. The present invention is applicable to intra-cell interference environments as well as inter-cell interference environments.

MODE FOR INVENTION

Figure 1:
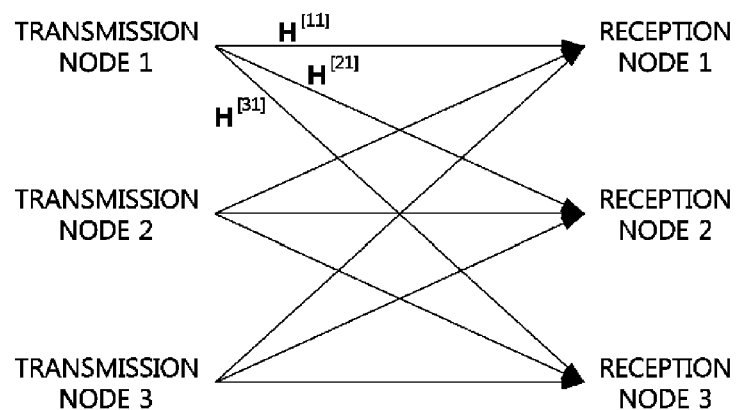
FIG. 1 is a conceptual diagram illustrating an inter-cell interference control method in a wireless system having three transmission/reception nodes according to an exemplary embodiment of the present invention.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Terms containing ordinal numbers such as first, second, and the like, may be used to describe various components, but the components may not be limited to the terms. The terms are used for the purpose of distinguishing one component from another component. For example, a first component may be named a second component without departing from the scope of the present invention, and similarly, the second component may be named the first component. A term "and/or" will include a combination of plural associated items or any of plural associated items.

When one component is mentioned as being "linked" or "connected" to another component, the one component may be directly linked or connected to another component; however, intermediate component(s) may also be present therebetween. On the other hand, when one component is mentioned as being "directly linked" or "directly connected" to another component, it should be understood that no other intermediate components are present therebetween.

Terms used in the present invention are used to illustrate the preferred embodiments, but not intended to limit the present invention. A singular representation may include a plural representation unless it represents a substantially different meaning in the context. Terms "include" or "have" used in the present invention should be understood to indicate the presence of a feature, number, step, operation, component, item or any combination thereof, disclosed in the specification, but should not be understood to exclude the presence of one or more other features, numbers, steps, operations, components, or any combination thereof or possibility of adding these.

Unless defined differently, all terms used herein including technical or scientific terms may have the same meaning as those generally understood by an ordinary person skilled in the art to which the present invention belongs. Commonly used terms having the same meanings defined in the dictionary should be construed as having the meanings equal to the contextual meanings. Unless expressly defined in the present invention, such terms should not be construed as having ideal or excessively formal meanings.

Hereinafter, description will be given in detail of the preferred embodiments according to the present invention with reference to the accompanying drawings. For the sake of brief description with reference to the drawings, the same or equivalent components will be provided with the same reference numbers, and description thereof will not be repeated First, an interference control method proposed in the present invention is not limited to a main technique called an interference alignment, and is applicable to an interference control technique using cooperation beamforming such as coordinated scheduling/coordinated beamforming (CS/CB) coordinated multi-point transmission (CoMP). A representative field to which the present invention is applied is an interference alignment in intra-cell and inter-cell interference environments, and the present invention includes interference control through an interference alignment in uplink as well as interference control through an interference alignment in downlink in a wireless system having multiple transmission/reception nodes. Transmitting/receiving antennas include a single-antenna environment and a multi-antenna environment.

An example of an environment of K (=3) transmission/reception nodes as shown in FIG. 1 and M transmitting/receiving antennas will be described below. Here, it is assumed that M is an even number. Various environments can be referred to from [Reference Literature 1].

In FIG. 1, a channel matrix $H^{[i,j]}$ represents a multi-antenna channel between an $i^{th}$ and a $j^{th}$ transmission node.

An $i^{th}$ transmission node transmits M/2 streams $x^i(t)$ in an M-dimensional vector $x^{[i]}(t)$ as shown in the following equation using an M×M/2-dimensional precoding matrix $v^{[i]}$.

$$x^{[i]}(t) = V^{[i]} x^i(t) \quad \text{[Equation 1]}$$

On the other hand, the $i^{th}$ reception node receives a signal vector as shown in the following equation from transmission signals of the K (=3) transmission nodes.

$$y^{[i]}(t) = H^{[i1]} V^{[1]} x^1(t) + H^{[i2]} V^{[2]} x^2(t) + H^{[i3]} V^{[3]} x^3(t) + z^{[i]}(t) \quad \text{[Equation 2]}$$

Here, $z^{[i]}(t)$ is a noise vector of the $i^{th}$ reception node. In the interference alignment technique of the related art, it is assumed that all transmission/reception nodes should know all channels $H^{[i,j]}, \forall i,j$. That is, in the interference alignment technique of the related art, a transmission node (for example, an evolved node-B (eNB)) and a reception node (for example, a UE) should know all channels $H^{[i,j]}, \forall i,j$. In this case, each transmission/reception node can calculate the following precoding matrix $v^{[i]}$, i=1, 2, 3.

$$\text{span}(V^{[1]}) = \text{span}(EV^{[1]})$$

$$V^{[2]} = FV^{[1]}$$

$$V^{[3]} = GV^{[1]} \quad \text{[Equation 3]}$$

Here, E, F, and G are given as follows.

$$E = F^{-1}(H^{[12]})^{-1} H^{[13]} G$$

$$F = (H^{[32]})^{-1} H^{[31]}$$

$$G = (H^{[23]})^{-1} H^{[21]} \quad \text{[Equation 4]}$$

First, $V^{[1]}$ can be defined as follows.

$$V^{[1]} = [e_1, e_2, \ldots, e_{M/2}] \quad \text{[Equation 5]}$$

Here, $e_i$ is an $i^{th}$ eigenvector of E.

Thus, $V^{[i]}$, i=2, 3 can be obtained using Equations 2 and 3. If the transmission nodes respectively transmit signals using the precoding matrix, the reception nodes perform zero-forcing for interference cancellation. To this end, the reception node can also calculate $V^{[i]}$, i=1, 2, 3 using channel information $H^{[i,j]}, \forall i,j$ and can secure M/2 interference-free multi-antenna paths if the zero-forcing is performed.

For example, assuming that M=2, precoded channels of transmission nodes 2 and 3 are aligned as $H^{[12]}V^{[2]} = aH^{[13]}V^{[3]}$ by the interference alignment technique in a reception node 1 (here, a is an arbitrary constant). The reception node 1 receives the following signal.

$$y^{[1]}(t) = H^{[11]} V^{[1]} x^{[1]}(t) + \quad \text{[Equation 6]}$$

$$\sum_{j=2,3} H^{[1,j]} V^{[j]} x^{[j]}(t) + z^{[1]}(t)$$

$$= H^{[11]} V^{[1]} x^{[1]}(t) + H^{[12]} V^{[2]}$$

$$(x^{[2]}(t) + a x^{[3]}(t)) + z^{[1]}(t)$$

$$= \overline{H}^{[1]} \overline{X}(t) + z^{[1]}(t)$$

Here, $$\overline{H}^{[1]} = [H^{[11]} V^{[1]} H^{[12]} V^{[2]}], \overline{X}(t) = [x^{[1]}(t), x^{[12]}(t) + a x^{[3]}(t)]^T.$$

Since the reception signal is a two-dimensional vector, the reception signal is expressed by two bases. $x^{[1]}(t)$ occupies one basis and signals of the transmission nodes 2 and 3 overlap on the other basis. A signal $x^1(t)$ to be decoded is arranged in a first stream of a reception signal vector.

As seen from the above-described Equation 6, the reception signal of the reception node 1 can be expressed as a reception signal of a multi-antenna system. Accordingly, it is possible to decode a transmission message through $x^{[1]}(t)$ by mitigating interference through minimum mean square error (MMSE) filtering in an environment where interference is perfectly removed through zero-forcing or an SNR is low.

The interference alignment technique of the related art proposes a method in which M/2 interference-free multi-antenna paths exist between all transmission nodes j and all reception nodes i in K≥2 nodes. That is, a core idea is that all interference signals from a $j^{th}$ (≠$i^{th}$) transmission node can be aligned in the remaining M/2 paths. This proves that each node may obtain M/2 spatial multiplexing gains, but may not conversely obtain more spatial multiplexing gains.

In the interference alignment technique of the related art, there is a precondition that the transmission/reception node should know all pieces of channel information and therefore there is difficulty in implementation as described above.

The present invention proposes a method capable of performing an interference alignment even when only a reception node (for example, a UE) knows channel information $H^{[i,j]}, \forall i,j$. First, the reception node should know the channel information $H^{[i,j]}, \forall i,j$ to calculate a precoding matrix $V^{[i]}$, i=1, 2, 3. When the precoding matrix calculated in the reception node (for example, the UE) is fed back to each transmission node (for example, serving eNB), the transmission node does not require channel information since the transmission node does not need to additionally calculate the same precoding matrix.

An inter-cell interference control method through channel information sharing (channel state information (CSI) sharing) between reception nodes according to an exemplary embodiment of the present invention will be described below.

Figure 2:
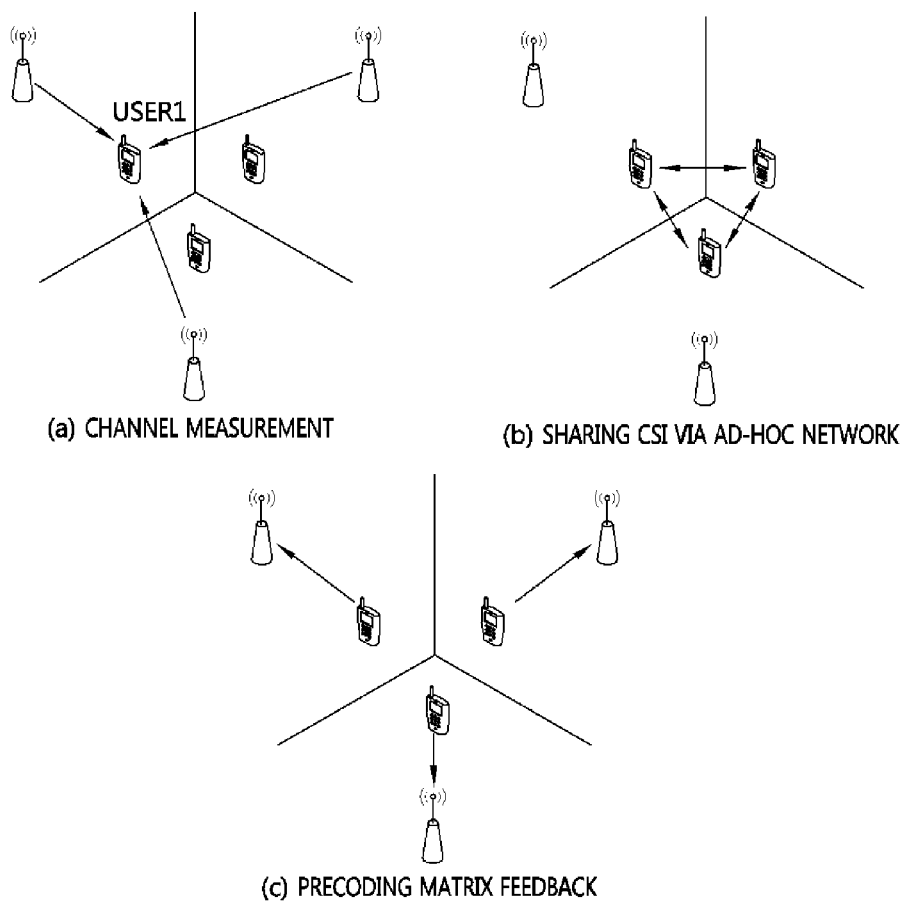
FIG. 2 is a conceptual diagram illustrating an inter-cell interference control method through channel information sharing between reception nodes according to an exemplary embodiment of the present invention.
Figure 3:
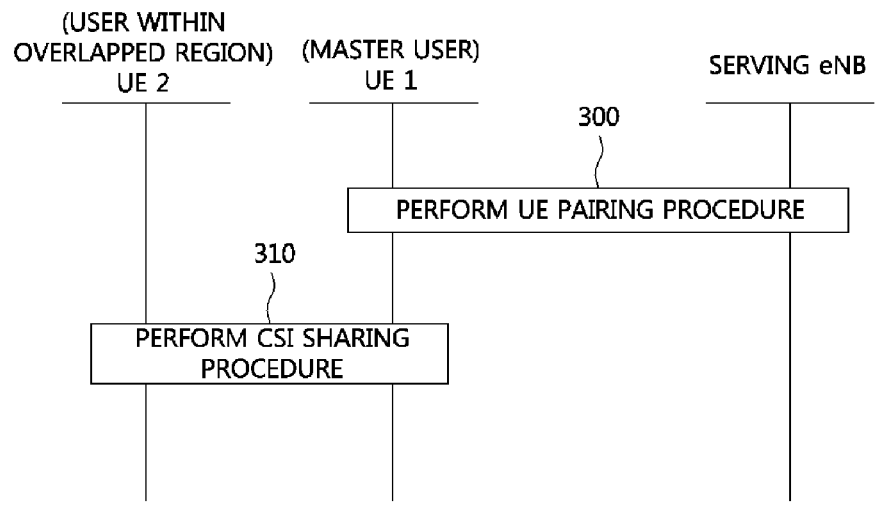
FIG. 3 is a sequence diagram illustrating an inter-cell interference control method through channel information sharing between reception nodes according to an exemplary embodiment of the present invention.

FIG. 2 is a conceptual diagram illustrating an inter-cell interference control method through CSI sharing according to an exemplary embodiment. For example, FIG. 2 illustrates an interference alignment procedure for downlink of a system including three cells (eNBs) according to an exemplary embodiment of the present invention. FIG. 3 is a sequence diagram illustrating an inter-cell interference control method through CSI sharing between reception nodes according to an exemplary embodiment of the present invention.

Figure 4:
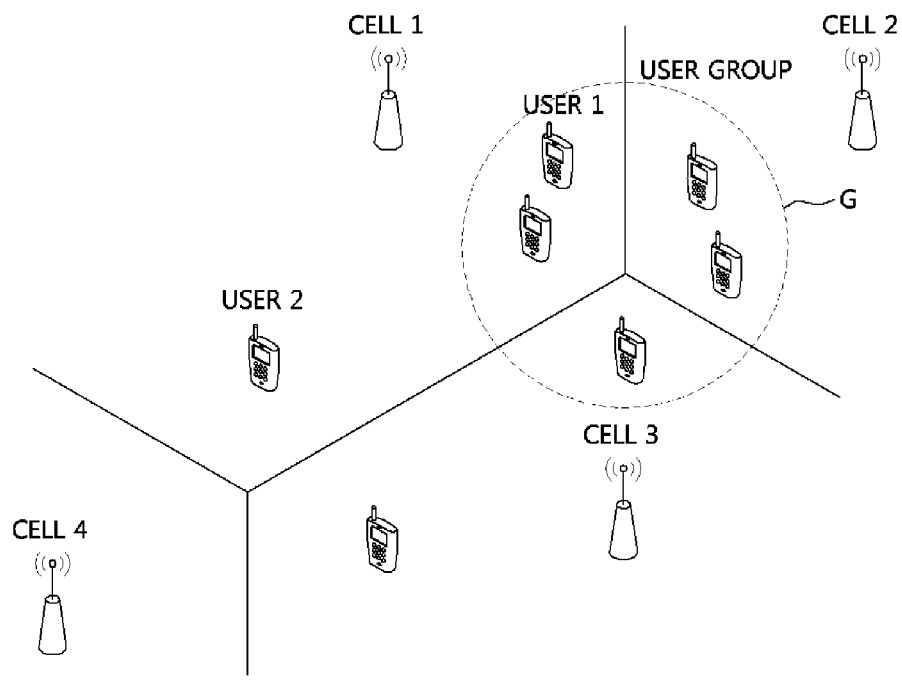
FIG. 4 is a conceptual diagram illustrating a user or user equipment (UE) pairing procedure of FIG. 3.
Figure 5:
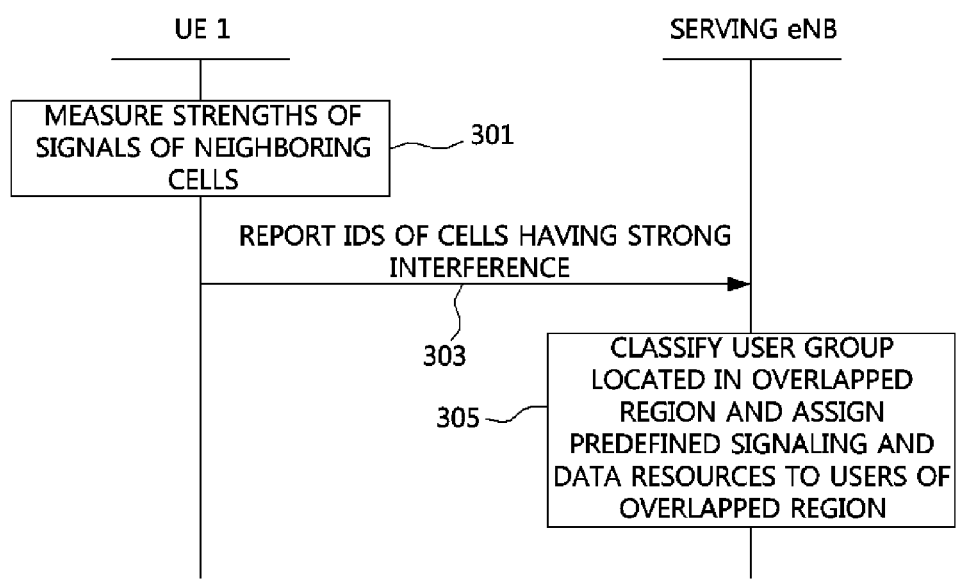
FIG. 5 is a sequence diagram illustrating the UE pairing procedure of FIG. 3.

FIG. 4 is a conceptual diagram illustrating a user or user equipment (UE) pairing procedure of FIG. 3, and FIG. 5 is a sequence diagram illustrating the UE pairing procedure of FIG. 3.

Figure 6:
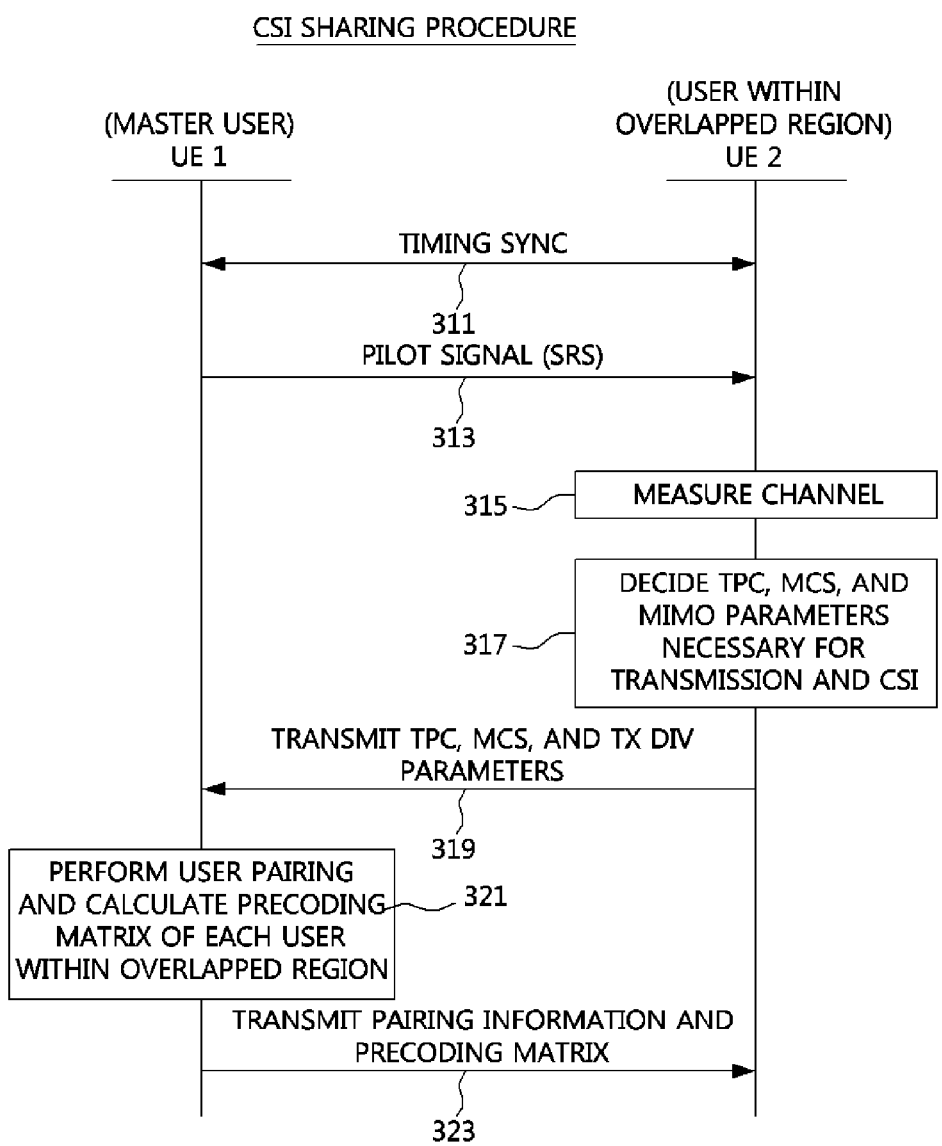
FIG. 6 is a sequence diagram illustrating a channel information sharing procedure of FIG. 3.

FIG. 6 is a sequence diagram illustrating a CSI sharing procedure of FIG. 3.

An inter-cell interference control method through CSI sharing between reception nodes according to an exemplary embodiment of the present invention in the downlink of the system including three cells (evolved node-Bs (eNBs)) will be described in detail below with reference to FIGS. 2 to 6.

The inter-cell interference control method through CSI sharing between reception nodes according to an exemplary embodiment of the present invention can perform the UE pairing procedure by a master user selected from an interference alignment user group (see FIG. 2(*a*) and FIG. 4) located in a cell edge of the cells 1, 2, and 3 and affected by strong interference. The number of users per cell may be set to one or more through the interference alignment user group classification. Accordingly, the UE pairing procedure is necessary between users who respectively correspond to cells. To this end, it is possible to first select a master user in consideration of a cell center location in the interference alignment user group, UE capability, and the like and to cause the master user to perform the user pairing (or UE pairing) and calculate an interference alignment precoding matrix to be described later.

Referring to FIG. 3, a UE 1 of a master user performs a UE pairing procedure with a serving eNB (step 300).

After performing the UE pairing procedure, the master UE 1 performs a CSI sharing procedure with each user belonging to a user group affected by the strong interference (the strong interference denotes more dominant interference among various interferences in exemplary embodiments of the present invention) (step S310). Through the CSI sharing procedure of step 310, each UE (or reception node) acquires all pieces of CSI $H^{[i,j]}$, $\forall i,j$ by mutually transmitting/receiving the CSI via device-to-device (D2D) or an ad-hoc network. For this, a link should be formed between UEs (or reception nodes). Control information used in the generally known procedure can be used as control information necessary for the link. Each UE (or reception node) can calculate $V^{[i]}$, i=1, 2, 3 using $H^{[i,j]}$, $\forall i,j$.

The UE pairing procedure of FIG. 3 will be described in detail below with reference to FIGS. 2, 4, and 5.

A UE (or reception node) 1 located in a cell edge of FIG. 2 measures channels from multiple cells around the UE 1 by using pilot signals transmitted from cells (eNBs), for example, by using a CSI-reference signal (CSI-RS) signal (step 301) (see FIG. 2(*a*)). Here, the UE 1 can obtain CSi $H^{[1,j]}$, $\forall j$ of multiple cells around the UE 1 through the channel measurement. Likewise, the remaining UEs (or reception nodes) 2 and 3, excluding the UE 1, of FIG. 2(*a*) perform channel measurement.

The UE 1 measures the strength of a neighboring cell signal and notifies its own serving cell of a cell identity (ID) of a neighboring cell having strong interference (step 303). A cell 1 is a serving cell of the UE 1.

The cell 1 collects notifications from users of the cell edge, classifies an interference alignment user group located in an overlapped region with cells 2 and 3, assigns signaling and data resources (time/frequency resources for control signaling and data streams) predefined among the cells 1, 2, and 3 to users of the overlapped region, and acquires inter-cell synchronization (step 305). Since it is possible to know that a user 2 of FIG. 4 is not located in the overlapped region of the cells 1, 2, and 3 by the UE pairing procedure, it can be seen that the user 2 is excluded from the interference alignment user group of the cells 1, 2, and 3. Accordingly, the interference alignment user group of the overlapped region of the cells 1, 2, and 3 can be classified through the UE pairing procedure.

First, timing synchronization is set between UEs belonging to the interference alignment user group (step 311).

A master UE within the interference alignment user group of the cells 1, 2, and 3 transmits a pilot signal (for example, a sounding reference signal (SRS)) to each UE within the interference alignment user group through an allocated uplink signaling resource (step 313). At this time, each UE should be able to demodulate pilot signals of the users within the interference alignment user group.

Each user within the interference alignment user group receives the pilot signals to perform channel measurement (step 315), stably decides multiple-input multiple-output (MIMO) parameters and the like such as parameters of transmit power control (TPC) necessary for transmission, a modulation and coding selection (MCS) level, and transmit (TX) diversity, and transmits the transmission parameters including the MIMO parameters and the like such as the MCS level and the TX diversity to the master UE (step 319). Through this procedure, all users within the interference alignment user group as well as the master user can stably receive and mutually share CSI.

The master user performs user pairing between users in consideration of frequency efficiency, an interference alignment gain, fairness between the users, and the like in combinations between all users within the interference alignment user group through the above-described interference alignment scheme using all pieces of CSI, and calculates and decides a precoding matrix of each user within the interference alignment user group (step 321). The master user transmits the pairing information and the precoding matrix decided as described above to UEs within the interference alignment user group (or UEs within the overlapped region).

After performing a procedure in which the UEs within the interference alignment group share the CSI as described above, each user within the interference alignment user group reports pairing and precoding information to its own serving cell as shown in FIG. 2(*c*). Here, a UE (or reception node) i feeds a precoding matrix $V^{[i]}$ back to its own serving cell i. When each cell transmits a transmission signal using a fed-back precoding matrix of each user, inter-cell interference is aligned in each reception node, so that a UE (or reception node) can decode its own message by removing interference through zero-forcing.

At this time, if the cells 1, 2, and 3 are connected to one super cell, all the cells can acquire necessary information such as pairing information and precoding information through the super cell when the master user reports the pairing information and the precoding information only to its own serving cell.

Interference control methods other than the interference control method according to the above-described exemplary embodiment of the present invention may be used.

In an interference control method according to another exemplary embodiment of the present invention, a wireless connection technique such as D2D can be used so that CSI is shared between reception nodes (or UEs), and a different type of wireless connection technique such as wireless fidelity (WIFI) can be used.

In an interference control method according to still another exemplary embodiment of the present invention, pilot signals to be transmitted by users can be pilot signals to be transmitted to their own serving cells as in the related art, and can be separate pilot signals for users within the interference alignment user group.

In an interference control method according to yet another exemplary embodiment of the present invention, it is possible to avoid a problem such as battery consumption or the like in a UE selected as a master user by providing a fusion center or a relay node in an edge center of the cells 1, 2, and 3 and causing the fusion node or the relay node to play the role of a master user.

A UE pairing procedure for CS/CB CoMP according to yet another exemplary embodiment of the present invention will be described below.

First, a high-level coarse pairing procedure will be described.

An eNB can recognize cell-edge full-buffer UEs (e.g., by using a channel quality indicator (CQI)) and dominantly interfering eNBs (e.g., by making the UEs report interfering cell IDs to the serving eNB). The eNB can perform the coarse pairing procedure according to the above information.

The high-level pairing will be described with reference to FIG. 4. A serving cell of the users 1 and 2 can know that the user 1 is interfered with by neighboring cells 2 and 3 from interference cell information reported by the users 1 and 2, and can know that the user 2 is interfered with by neighboring cells 3 and 4. Using the above-described information, the user 1 is classified (paired) to belong to a cell-edge user group located in an overlapped region of the cells 1, 2, and 3.

Next, a fine pairing procedure will be described.

Using the coarse pairing, CoMP eNBs inform a UE of whether it belongs to a particular CoMP UE set, and assign a control (SRS, etc) resource designated to the CoMP UE set.

The CoMP UE transmits SRS with the coordinated resource.

CoMP UEs share CSI.

A master UE performs UE pairing in the CoMP UE set and informs other UEs of the pairing decision and precoding matrices. Each UE feeds a precoding matrix (or precoding matrix indicator (PMI)) back to an eNB.

As shown in FIG. 6, the CSI can be shared via D2D. The CoMP UEs use the above designated control resource. Determination of TPC, MCS, and other TX parameters depends on the condition of the worst case UE.

The interference control methods based on downlink have been described in the above-described exemplary embodiments of the present invention, but uplink interference may be controlled through an interference alignment in the same procedure for the uplink of the system.

The above-described interference alignment technique is originally applied to an inter-cell interference situation, but may also be used as a technique of controlling intra-cell interference in a multiuser environment. For example, the downlink of a multiuser MIMO system may be considered.

In the multiuser MIMO system, a single cell should know all pieces of CSI for effective interference control. However, according to exemplary embodiments of the present invention, each reception node can calculate a precoding matrix for an interference alignment if reception nodes mutually share CSI, and the interference alignment can be performed by feeding a precoding matrix of each reception node back to a transmission node. In this case, it is not possible to obtain the capacity of a multiuser MIMO channel as in a dirty-paper coding technique. However, since the transmission node does not need to know the CSI, implementation is significantly improved and the performance approaching the channel capacity can be obtained through the interference alignment.

To obtain a precoding gain by distributing transmit power of a transmission node at a low SNR in a good MIMO transmitting/receiving antenna channel direction (eigendirection or eigenmode), it is possible to use the following interference alignment scheme by including the interference alignment condition equation of the above-described Equation 3 in a condition equation of a linear precoding optimization problem in another exemplary embodiment of the present invention. In this case, the interference alignment can be performed simultaneously when a precoding gain is obtained through an appropriate optimization algorithm.

The following scheme has an advantage in that the reception nodes share CSI without any limit.

First, a channel matrix is expressed by singular value decomposition (SVD) as shown in the following Equation 7.

$$H^{[ii]} = U^{[i]} \Sigma^{[i]} V^{[i]}$$ [Equation 7]

Here, $U^{[i]}$, $V^{[i]}$ are unitary matrices and $\Sigma^{[i]}$ is a diagonal matrix including singular values.

According to the proposed method, an $i^{th}$ transmission node transmits M/2 streams $x^i(t)$ using an M×M/2-dimensional precoding matrix $V^{[i]}*B^{[i]}$ in an M-dimensional vector $x^{[i]}(t)$ as shown in the following Equation 8.

$$x^{[i]}(t) = V^{[i]} * B^{[i]} x^i(t)$$ [Equation 8]

On the other hand, the $i^{th}$ reception node receives a signal vector as shown in the following Equation 9 by transmission signals of K (=3) transmission modes.

$$y^{[i]}(t) = H^{[i1]} V^{[1]} * B^{[1]} x^1(t) + H^{[i2]} V^{[2]} * B^{[2]} x^2(t) + H^{[i3]} V^{[3]} * B^{[3]} x^3(t) + z^{[i]}(t)$$ [Equation 9]

Next, in the case of a first reception node, $U^{[1]}*$ is multiplied as follows to obtain a precoding gain.

$$U^{[1]}*y^{[1]}(t) = \Sigma^{[1]} B^{[1]} x^1(t) + U^{[1]} * (H^{[12]} V^{[2]} * B^{[2]} x^2(t) + H^{[13]} V^{[3]} * B^{[3]} x^3(t) + z^{[i]}(t))$$ [Equation 10]

Here, it should be noted that $U^{[i]}$, $V^{[i]}$ do not affect the interference alignment. It is possible to still satisfy precoding matrix conditions for the interference alignment as shown in Equation 3. At this time, Equation 3 is replaced with the following condition equation.

$$\text{span}(B^{[1]}) = \text{span}(E'B^{[i]})$$

$$B^{[2]} = F'B^{[1]}$$

$$B^{[3]} = G'B^{[1]}$$ [Equation 11]

Here, E', F', and G' are given as follows.

$$E' = F'^{-1} (H^{[12]} V^{[2]}*)^{-1} H^{[13]} V^{[3]} * G'$$

$$F' = (H^{[32]} V^{[2]}*)^{-1} H^{[31]} V^{[1]}*$$

$$G' = (H^{[23]} V^{[3]}*)^{-1} H^{[21]} V^{[1]}*$$ [Equation 12]

Now, a method of obtaining a precoding gain by the reception signal will be described.

For example, M=2. In this case, precoded channels of the transmission nodes 2 and 3 are aligned as $H^{[i2]}V^{[2]}*B^{[2]} = aH^{[i3]}V^{[3]}*B^{[3]}$ by the interference alignment condition equation in the reception node 1, and the reception signal of the reception node 1 is expressed as follows.

$$U^{[1]*} y^{[1]}(t) = \Sigma^{[1]} B^{[1]} x^1(t) + U^{[1]*} H^{[12]} V^{[2]*} B^{[2]}$$ [Equation 13]

$$(x^{[2]}(t) + ax^{[3]}) + z^{[1]'(t)}$$

$$= \overline{H}^{[1]'} \overline{X}(t) + z^{[1]'(t)}$$

Here, $$\overline{H}^{[1]'} = [\Sigma^{[1]} B^{[1]}, U^{[1]} * H^{[12]} V^{[2]} * B^{[2]}], \overline{X}(t) = [x^{[1]}(t), x^{[2]}(t) + ax^{[3]}(t)]^T,$$

$$z^{[1]'}(t) = U^{[1]} * z^{[1]}(t)$$

It can be seen that a signal $x^1(t)$ to be decoded as described above is located in a first stream of a reception signal vector if interference is removed from the reception signal of Equation 10 by zero-forcing or MMSE filtering.

A precoding gain by the transmission/reception scheme can be first checked through $\Sigma^{[1]}$. $x^1(t)$ is transmitted in an eigendirection of a channel by precoding the transmission signal into $V^{[1]}$ and multiplying the reception signal by $U^{[1]*}$. This means that transmit power is concentrated in the first stream. The reason is that diagonal elements of the diagonal matrix $\Sigma^{[1]}$ have decreasing singular values in sequence beginning with a first diagonal element.

In terms of precoding gains, the second reason is that $B^{[1]}$ and $B^{[2]}$ of Equation 13 play the role of a random beamforming matrix and interference alignment can be performed at $B^{[1]}$ and $B^{[2]}$ through which high precoding gains can be obtained through opportunistic scheduling.

The present invention has been described with reference to the above exemplary embodiments. It will be apparent to those skilled in the art that various modifications are possible without departing from the spirit or scope of the invention disclosed in the appended claims.

The invention claimed is:

1. An interference control method in a wireless system having multiple transmission/reception nodes, comprising:
   performing, by one of a plurality of reception nodes belonging to a predetermined group, a user equipment (UE) pairing procedure with a transmission node; and
   performing, by the one reception node, a channel information sharing procedure of sharing channel information with other reception node belonging to the predetermined group,
   wherein the channel information sharing procedure includes deciding, by the one of the plurality of reception nodes, a precoding matrix of each UE within the user group by using channel information of the plurality of reception nodes,
   wherein the predetermined group includes a plurality of UEs located in an edge of a plurality of cells and affected by strong interference as the plurality of reception nodes,
   wherein the one reception node is a master UE, and
   wherein the channel information sharing procedure includes transmitting and receiving channel information of the plurality of reception nodes via device-to-device (D2D) between the plurality of reception nodes belonging to the predetermined group.

2. The interference control method according to claim 1, wherein the UE pairing procedure includes:
   receiving, by the master UE, pilot signals transmitted from neighboring cells to perform channel measurement; and
   reporting, by the master UE, cell identities (IDs) of neighboring cells having strong interference to the master UE's serving cell.

3. The interference control method according to claim 2, wherein the UE pairing procedure further includes collecting, by the serving cell, notifications of the IDs of the neighboring cells having the strong interference from UEs of the cell edge, classifying a user group located in an overlapped region between the serving cell and the neighboring cells, and assigning signaling and data resources predefined between the serving cell and the neighboring cells to UEs of the overlapped region.

4. The interference control method according to claim 1, wherein the channel information sharing procedure further includes transmitting, by the master UE, the decided precoding matrix to each UE within the user group.

5. The interference control method according to claim 4, further comprising feeding, by each reception node, the precoding matrix decided using the shared channel information back to the transmission node.

6. The interference control method according to claim 1, wherein the channel information sharing procedure includes transmitting and receiving channel information of the plurality of reception nodes via an ad-hoc network between the plurality of reception nodes belonging to the predetermined group.

* * * * *